United States Patent Office 3,661,976
Patented May 9, 1972

3,661,976
4,4'-(2-CYCLOALKYL-ALKYLIDENE)DIPHENOLS AND ETHERS AND ESTERS THEREOF
Eugene L. Wittle, Ann Arbor, Mich., assignor to Parke, Davis & Company, Detroit, Mich.
No Drawing. Filed May 16, 1969, Ser. No. 825,432
Int. Cl. C07d 7/04; C07c 69/16, 39/12
U.S. Cl. 260—479 R    4 Claims

ABSTRACT OF THE DISCLOSURE

A series of 4,4'-(2-cycloalkylalkylidene)diphenols; lower alkyl and tetrahydropyranyl ethers; and esters with carboxylic and sulfonic acids. The compounds have pharmacological activities, especially as anti-fertility agents. They can be produced by (a) reacting a substituted phenyl-magnesium bromide with a carboxylate ester and hydrolyzing and dehydrating the product, (b) hydrolyzing an ether, (c) esterifying a diphenol, (d) hydrolyzing an ester, or (e) converting a diphenol to an ether.

SUMMARY AND DETAILED DESCRIPTION

This invention relates to new aromatic compounds. More particularly, it relates to new 4,4'-(2-cycloalkyl-alkylidene)diphenols, and ethers and esters thereof, of the formula

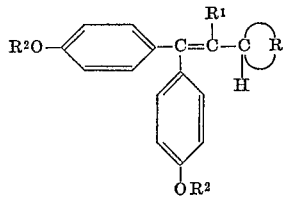

and to methods for their production. In this formula, R represents (a) an alkylene radical containing 4 to 8 carbon atoms inclusive, of which 4 or 5 are, in annular position with the carbon atom to which R is attached, or (b) hexamethylene; $R^1$ represents hydrogen or lower alkyl; and $R^2$ represents hydrogen, lower alkyl, tetrahydropyranyl, lower alkanoyl, cyclohexanecarbonyl, methanesulfonyl, p-toluene-sulfonyl, or a group of the formula

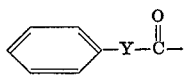

where Y represents a direct bond, methylene (—$CH_2$—), ethylene (—$CH_2CH_2$—), or imino (—NH—). The lower alkyl and lower alkanoyl groups are those containing not more than 4 carbon atoms. As indicated by the foregoing definitions, the grouping

can represent cyclopentyl, alkyl-substituted cyclopentyl, cyclohexyl, alkyl-substituted cyclohexyl, or cycloheptyl.

In accordance with the invention, the compounds of the foregoing formula wherein $R^2$ represents hydrogen or lower alkyl can be produced by reacting a reactive metal deivative which can be represented by the formula

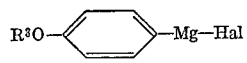

with a carboxylate ester of the formula

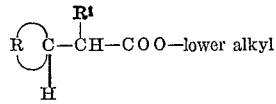

in an anhydrous medium followed by reacting the product with an aqueous acidic medium whereby hydrolysis and dehydration occur with the formation of a double bond between the carbon atoms to which the cyclic groups are attached; where $R^3$ represents lower alkyl or tetrahydropyranyl; Hal represents halogen, preferably bromine; and R and $R^1$ are as defined before. When $R^3$ represents lower alkyl, then $R^2$ in the final product also represents lower alkyl. However, when $R^3$ represents tetrahydropyranyl, then $R^2$ in the final product represents hydrogen since the tetrahydropyranyl ether is cleaved during the reaction with the aqueous acidic medium. The first step of this process is carried out in an anhydrous non-hydroxylic solvent. Some suitable solvents are lower molecular weight ethers such as diethyl ether, dibutyl ether, dioxane, and tetrahydrofuran; and aromatic hydrocarbons such as benzene and toluene. A preferred solvent is tetrahydrofuran. The reactive metal derivative is customarily prepared in situ by reacting a substituted halobenzene with magnesium but, if desired, it can be prepared separately and added to the reaction mixture as such. The reactants are normally used in the proportion of two moles of the reactive metal derivative to one mole of the carboxylate ester, although, if desired, this proportion can be varied to provide an excess of either starting material. The time and temperature of the first step of the process are not critical and it is customary to carry out the reaction at a temperature between 10° and 140° C. or the reflux temperature of the solvent using a reaction time of from a few minutes to 24 hours. Using tetrahydrofuran as solvent at the reflux temperature, the usual reaction time is from 2 to 6 hours. Following the reaction of the reactive metal derivative in anhydrous medium, the product is reacted with an aqueous acidic medium in order to cause hydrolysis of the organometallic intermediate, hydrolysis of the tetrahydropyranyloxy group if present, and dehydration to form a double bond. This step of the process can, if desired, be carried out in two stages consisting of an initial treatment with water and a subsequent treatment with dilute acid. The temperature required for dehydration varies with the nature of the group $R^1$. Temperatures of 90–100° C. are preferred, especially when $R^1$ represents lower alkyl; although lower temperatures are also satisfactoy, especially when $R^1$ represents hydrogen.

Some of the carboxylate esters required as starting materials in the foregoing process are known compounds. Others can be prepared by any of a variety of methods. In one such method, a carboxylic acid of the formula

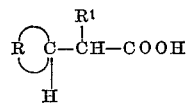

is reacted with a lower alkanol in the presence of a mineral acid catalyst. In another method, an alkyl 2-bromoalkanoate is reacted with a cycloalkanone of the formula

in the presence of zinc in an inert solvent and the product is hydrolyzed with aqueous mineral acid and dehydrated by heating with p-toluenesulfonic acid. The dehydration product can be a mixture of compounds containing a double bond in the cycloalkane ring or an exocyclic double bond. The dehydration product is subjected to catalytic hydrogenation to produce an alkyl cycloalkylalkanoate which is the carboxylate ester useful as a starting material in the foregoing process. Some of the carboxylate esters exhibit stereoisomerism. For example, in the particular case of alkyl 2-(4-methylcyclohexyl)propionates, hydrogenation in neutral medium with palladium catalyst produces principally the isomer identified hereinafter as isomer A. Hydrogenation in neutral or acidic medium with platinum catalyst produces principally isomer B. Hydrogenation in acidic medium using palladium catalyst produces approximately equal amounts of isomer A and isomer B. In the case of the production of the alkyl 2-(4-ethylcyclohexyl)propionates and the alkyl 2-(4-propylcyclohexyl)propionates, the formation of isomer A is favored under a wider range of hydrogenation conditions. The relationship between isomer A and isomer B in these compounds and in the final products of the invention will be explained in greater detail hereinafter.

Also in accordance with the invention, the diphenol compounds of the invention, that is, the compounds wherein $R^2$ represents hydrogen can be produced by reacting the corresponding lower alkyl ethers (wherein $R^2$ represents lower alkyl) with a hydrolytic agent. Some examples of suitable hydrolytic agents are aqueous polar solvents containing a base such as an alkali metal hydroxide. Some suitable polar solvents are lower alkanols, diethylene glycol, and triethylene glycol. The preferred hydrolytic agent is sodium hydroxide or potassium hydroxide in diethylene glycol containing at least a trace amount of water. In general, the reaction is carried out at temperatures ranging from 75 to 250° C. or at the reflux temperature of the solvent for from one to 24 hours. Using diethylene glycol at the reflux temperature, the preferred reaction time is about 3 hours. Longer reaction times are used when a lower alkanol is employed as the solvent. Under basic reaction conditions, the product is isolated directly as a phenolate salt or, following acidification, as the free diphenol.

Further in accordance with the invention, the esters of the invention, that is, the compounds wherein $R^2$ represents lower alkanoyl, cyclohexanecarbonyl, methanesulfonyl, p-toluenesulfonyl, or a group of the formula

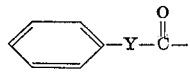

where Y is as defined before can be produced by reacting the corresponding diphenols (wherein $R^2$ represents hydrogen) with a carboxylic acid or sulfonic acid of the formula AcOH or a reactive derivative thereof; where Ac represents lower alkanoyl, cyclohexanecarbonyl, methanesulfonyl, p-toluenesulfonyl, or a group of the formula

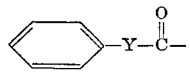

where Y is as defined before. Some examples of suitable reactive derivatives are the acid halides and the acid anhydrides. It is preferred to use at least two moles of the acid or its reactive derivative for each mole of the diphenol. The reaction can be carried out in the absence of a solvent or in the presence of a suitable solvent such as a tertiary amine, ether, tertiary amide, aromatic hydrocarbon, or halogenated hydrocarbon. The reaction is preferably carried out in the presence of a base. Some examples of suitable bases are alkali metal hydrides, alkali metal amides, alkali metal alkoxides, and tertiary amines. A preferred solvent is pyridine which can also serve as the base in the reaction. When the carboxylic acid or sulfonic acid is a reactant, the reaction is sometimes carried out under acidic conditions. The time and temperature of the reaction are not critical but in general higher temperatures and a longer reaction time are used when the acid is a reactant rather than one of its reactive derivatives. Normally the reaction is carried out at a temperature from 0 to 100° C. or the reflux temperature of the solvent for from 30 minutes to 24 hours.

Still further in accordance with the invention, the diphenols of the invention, that is, the compounds wherein $R^2$ represents hydrogen can be produced by reacting the corresponding esters (wherein $R^2$ represents lower alkanoyl, cyclohexanecarbonyl, methanesulfonyl, p-toluene-sulfonyl, or a group of the formula

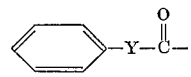

where Y is as defined before) with a hydrolytic agent. Some examples of suitable hydrolytic agents are water and aqueous solutions of bases or acids such as alkali metal hydroxides, alkaline earth metal hydroxides, alkali metal carbonates, trialkylammonium hydroxides, mineral acids, and strong organic acids. Aqueous solutions of alkali metal hydroxides are preferred since the diphenolic products are somewhat less stable under acidic conditions. It is desirable to use also an additional solvent such as a lower alkanol or glycol or a water soluble ketone or ether. At least the calculated amount and preferably a considerable excess of the hydrolytic agent is used. While the time and temperature of the reaction are not critical, it is customary to carry out the hydrolysis at a temperature of from 15 to 150° C. or at the reflux temperature for from 15 minutes to 24 hours, the longer reaction times being used at the lower temperatures.

Yet further in accordance with the invention, the ethers of the invention, that is, the compounds wherein $R^2$ represents lower alkyl or tetrahydropyranyl can be produced by reacting the corresponding diphenol compounds (wherein $R^2$ represents hydrogen) with an alkylating agent or with dihydropyran. The alkylating agent is preferably a reactive derivative of a lower alkanol such as diethyl sulfate, ethyl iodide, propyl bromide, propyl iodide, butyl iodide, or methyl p-toluenesulfonate. Basic conditions are preferred for reaction with an alkylating agent; whereas acidic conditions are preferred for reaction with dihydropyran. The reaction is carried out in a suitable solvent such as ether, tetrahydrofuran, dioxane, benzene, N-methyl-2-pyrrolidinone, dimethylformamide, or an excess of dihydropyran. At least two moles and preferably an excess of the alkylating agent or dihydropyran are used for each mole of the diphenol. The time and temperature of the reaction are not critical and the reaction is conveniently carried out at a temperature of from 0–60° C. or the reflux temperature of the solvent for from one to 48 hours.

Many of the compounds of the invention can exist in various stereoisomeric and/or optically isomeric forms. This is true in most of the compounds in which R is branched (that is the compounds in which the cycloalkane ring has at least one substituent in addition to the substituent always present at position one). It is not true in those special cases where stereoisomerism does not occur because of symmetrical substitution such as in 4,4-dimethylcyclohexyl. A further explanation of the nature of the stereoisomerism will be given for the 4-monoalkylcyclohexyl compounds which are the preferred compounds of the invention. In a typical starting material, ethyl 2-(4-methylcyclohexyl)-propionate, the substituents at the 1- and 4-positions of the cyclohexane ring, can be in either the cis or trans relationship to each other. This same cis or trans relationship persists when this starting material is converted into one of the final products of the invention. For purposes of this invention, the term, isomer A, is defined as the isomeric form (cis or trans) produced in greatest amount when ethyl 2-(4-methylcyclohexyl)propionate is prepared, as described herein, by hydrogenation with palladium on charcoal catalyst in neutral ethanol. The opposite isomer (cis or trans) is designated as isomer B. The term, isomer A, has the same meaning whenever used in this specification; and likewise, the term, isomer B, has the same meaning whenever used in this specification. In general, isomer A has a greater degree of anti-fertility activity than isomer B. However, the exact proportion of isomer A and isomer B in a product is not critical because both exhibit anti-fertility activity. The number of stereoisomers and/or optical isomers is increased as asymmetric centers are introduced by the presence of other substituents in the cycloalkane ring.

The phenolic groups present in the diphenols of the invention are weakly acidic groups. Accordingly, by virtue of their properties as weak acids, the diphenols of the invention form salts with relatively strong inorganic and organic bases such as sodium hydroxide, potassium hydroxide, tetramethylammonium hydroxide, and choline. These salts are generally equivalent to the diphenols themselves and are within the scope of the invention. However, they are not preferred forms of the invention because they are relatively unstable and tend to dissociate under neutral conditions and in aqueous media.

The compounds of the invention are new chemical substances of value as pharmacological agents and as chemical intermediates. They are anti-fertility agents and their activity in this respect can be demonstrated in standard assay procedures. In one such procedure, compounds are tested for their effectiveness in preventing pregnancies in mice. The compounds of the invention are administered orally by incorporation in the diet at such a concentration that each mouse will receive the preselected daily dosage. The assay procedure is begun by dividing female mice into treatment groups and untreated control groups with four mice housed in each cage. Two days after administration of the drug has begun, a fertile male is introduced into each cage and left there 12 days. A test compound is considered active if no pregnancies have occurred in a treatment group of eight female mice while a majority of the untreated control group produce litters. The activity of a test compound is stated as the minimal effective dose (mg./kg./day) at which no pregnancies occur in a treatment group of eight female mice. As indicated previously, the preferred compounds of the invention with respect to anti-fertility activity are the 4-monoalkylcyclohexyl compounds, especially those of the stereochemical form designated as isomer A. Some representative minimal effective doses for these compounds in the assay procedure described above are as follows. 4,4'-[2-(4-methylcyclohexyl)propenylidene]diphenol, diacetate ester (principally isomer A), 0.1 mg./kg./day. 4,4'-[2-(4-methylcyclohexyl)propenylidene]diphenol, diacetate ester (principally isomer B), 0.5 mg./kg./day. 4,4'-[2-(4-ethylcyclohexyl)propenylidene]diphenol, dibenzoate ester (principally isomer A), 0.1 mg./kg./day. 4,4' - [2 - (4-propylcyclohexyl)propenylidene]diphenol, diacetate ester (principally isomer A), 0.2 mg./kg./day. 4,4'-[2-(4-ethylcyclohexyl)propenylidene]diphenol, diacetate ester (principally isomer A), 0.1 mg./kg./day. Most other compounds of the invention have minimal effective doses in the range of 0.1 to 10 mg./kg./day. The compounds of the invention are also anti-implantation agents in rats and their anti-fertility activity can also be measured in this manner. In addition, many of the compounds of the invention are hypocholesteremic agents. For example, 4,4'-[2-(4-methylcyclohexyl)propenylidene]diphenol, diacetate ester (principally isomer A) at an oral dose of 25 mg./kg./day for one week, produced an 88% reduction in the average plasma cholesterol level compared with untreated controls. The compounds of the invention are active on oral administration and can also be given by the parenteral route if desired.

The invention is illustrated by the following examples.

Example 1

A solution of 4-(2-tetrahydropyranyloxy)phenylmagnesium bromide is prepared from 51.4 g. of 4-(2-tetrahydropyranyloxy)phenyl bromide, 8 g. of magnesium, and 400 ml. of tetrahydrofuran. With stirring, a mixture of 15.5 g. of ethyl cyclohexylacetate and 50 ml. of tetrahydrofuran is added dropwise and the reaction mixture is heated at reflux for 3 hours. It is then cooled, hydrolyzed by dropwise addition of a mixture of 25 ml. of water and 50 ml. of tetrahydrofuran, stirred for 4 hours, filtered, and the separated solid washed with 100 ml. of tetrahydrofuran and 50 ml. of methylene chloride. The filtrate and washes are combined, heated one hour at reflux with 75 ml. of 4 N hydrochloric acid, and concentrated almost to dryness. The residue is partitioned between 500 ml. of ether and 200 ml. of water. The ether phase is separated, washed four times with 100 ml. portions of water, dried over magnesium sulfate, and concentrated to give a residue of 4,4'-(cyclohexylvinylidene)diphenol which crystallizes by trituration with ether. This product has M.P. 228–230° C. following crystallization from acetone-ether.

Example 2

By the general procedure of Example 1, using a solution of p-methoxyphenylmagnesium bromide prepared from 37.0 g. of p-bromoanisole, 4.6 g. of magnesium, and 80 ml. of tetrahydrofuran, adding a mixture of 13.0 g. of ethyl 2-cyclohexylpropionate and 20 ml. of tetrahydrofuran, and using a reflux period of 5 hours, followed by hydrolysis with 10 ml. of water, filtration, and dehydration with 30 ml. of 4 N hydrochloric acid, the product obtained is 4,4'-(2-cyclohexylpropenylidene)diphenol dimethyl ether which crystallizes by trituration with petroleum ether-ether; M.P. 83–85° C. An additional quantity of product can be obtained by chromatography of the solution phase over neutral alumina using petroleum ether-ether mixtures for elution.

Example 3

By the general procedure of Example 1, using a solution of p-methoxyphenylmagnesium bromide prepared from 37.0 g. of p-bromoanisole, 4.8 g. of magnesium, and 100 ml. of tetrahydrofuran, and adding a mixture of 13.5 g. of ethyl 2-(4-methylcyclohexyl)propionate (70% isomer A and 30% isomer B) and 100 ml. of tetrahydrofuran, followed by hydrolysis with 10 ml. of water, filtration, and subsequent dehydration with 60 ml. of 4 N-hydrochloric acid, the product obtained is 1,1-bis(p-methoxyphenyl)-2-(4-methylcyclohexyl)propene; following crystalization from petroleum ether, it has M.P. 93–95° C. (71% isomer A and 29% isomer B).

In the same manner, using as starting material ethyl 2-(4-methylcyclohexyl)propionate (34% isomer A and 66% isomer B), the product obtained is 1,1-bis(p-methoxyphenyl)-2-(4-methylcyclohexyl)propene (37% isomer A and 63% isomer B); M.P. 81–83° C.

Example 4

By the general procedure of Example 1, using a solution of p-methoxyphenylmagnesium bromide prepared from 22.4 g. of p-bromoanisole, 2.8 g. of magnesium, and 100 ml. of tetrahydrofuran, adding a mixture of 10.6 g. of ethyl 2-(4-ethylcyclohexyl)propionate, concentrating the mixture until the temperature reaches 80° C., and then using a reflux period of 5 hours, followed by hydrolysis with 10 ml. of water, filtration and subsequent dehydration with 10 ml. of concentrated hydrochloric acid, the product obtained is 2-(4-ethylcyclohexyl)-1,1-bis(p-methoxyphenyl)propene; M.P. 77–80° C. following crystallization from ether-petroleum ether.

Example 5

A mixture of 10.0 g. of 4,4'-(2-cyclohexylpropenylidene)diphenol dimethyl ether, 40 ml. of diethylene glycol, and 10.0 g. of potassium hydroxide is allowed to stand 12 hours at 25° C., heated at 210° C. for 4 hours, cooled, and diluted with 100 ml. of water and 100 ml. of ether.

The aqueous phase is separated, acidified with hydrochloric acid, and extracted with 300 ml. of ether. This ether extract is washed with water, dried, and evaporated to give 4,4'-(2-cyclohexylpropenylidene)diphenol. This product is converted to the diacetate ester, M.P. 137–139° C., by reaction with acetic anhydride in pyridine followed by chromatography of the crude product on alumina.

Example 6

A mixture of 3.5 g. of 2-(4-ethylcyclohexyl)-1,1-bis(p-methoxyphenyl)propene, 10 ml. of diethylene glycol, and 3.5 g. of potassium hydroxide is stirred and heated at 210–230° C. for 3 hours and then cooled. The mixture is partitioned between water and ether. The aqueous phase is separated, acidified with hydrochloric acid, and extracted with ether. This ether extract is washed with water, dried, and evaporated to give a residue of 4,4'-[2-(4-ethylcyclohexyl)propenylidene]diphenol; M.P. 140–155° C. following crystallization from pentane-ether.

Example 7

A solution of 12 g. of 4,4'-(cyclohexylvinylidene)diphenol, 25 ml. of acetic anhydride, and 30 ml. of pridine is held at room temperature for 16 hours and then heated at 95° C. for 2 hours. The mixture is concentrated to dryness to give a residue of 4,4'-(cyclohexylvinylidene)diphenol, diacetate ester. For purification, the product is dissolved in petroleum ether-ether and the solution poured on a chromatography column prepared from 100 g. of neutral alumina. The column is eluted with additional quantities of petroleum ether-ether and the eluates containing product are combined and evaporated. Following crystallization from pentane, the product has M.P. 55–60° C.

The following additional esters are obtained by reacting the corresponding diphenols with acetic anhydride in pyridine according to the foregoing procedure.

4,4' - (2 - cyclohexylpropenylidene)diphenol, diacetate ester; M.P. 137–139° C. following crystallization from ether-pentane.

4,4'-[2-(4 - methylcyclohexyl)propenylidene]diphenol, diacetate ester; M.P. 116.5–117.5° C. (4% isomer A and 96% isomer B).

4,4'-[2 - (4 - ethylcyclohexyl)propenylidene]diphenol, diacetate ester; M.P. 100–102° C. following crystallization from petroleum ether.

Example 8

A solution of 3.1 g. of 4,4'-(2-cyclohexyl-1-butenylindene)diphenol, hemihydrate, 5 ml. of benzoyl chloride, and 30 ml. of pyridine is heated at 95° C. for one hour, cooled, and diluted with water. The insoluble product, 4,4' - (2 - cyclohexyl-1-butenylidene)diphenol, dibenzoate ester, is collected on a filter, washed with water, and dried. For purification, it is dissolved in 100 ml. of methylene chloride and the solution poured on a chromatography column prepared from 100 g. of neutral alumina. The column is eluted with petroleum ether-ether and the eluates containing product are combined and evaporated; M.P. 190–193° C. following crystallization from acetone.

The following additional esters are obtained by reacting the corresponding diphenols with benzoyl chloride in pyridine according to the foregoing procedure.

4,4' - [2 - (4 - methylcyclohexyl)propylidene]diphenol, dibenzoate ester; M.P. 160–163° C. (principally isomer A).

4,4'-[2 - (4 - methylcyclohexyl)propenylidene]diphenol, dibenzoate ester. The product is isolated by extracting the diluted reaction mixture with ether, washing the ether extract with water, evaporating the ether extract, and chromatographing the residue over 20 g. of alumina with petroleum ether-ether solvent. After chromatography and crystallization from ether-pentane, the product has M.P. 117–125° C. (principally isomer B).

4,4' - [2-(4-propylcyclohexyl)propenylidene]diphenol, dibenzoate ester; M.P. 187–188° C. following crystallization from ether-pentane.

Example 9

A solution of 500 mg. of 4,4'-[2-(4-methylcyclohexyl)propenylidene]diphenol (principally isomer A), 200 mg. of propionic anhydride, and 2 ml. of pyridine is heated at 95° C. for one-half hour and concentrated to dryness to give a residue of propionic acid, 4,4'-[2-(4-methylcyclohexyl)propenylidene]diphenol diester; M.P. 96–98° C. following crystallization from pentane (principally isomer A).

Similarly, from 4,4' - [2 - (4-ethylcyclohexyl)propenylidene]diphenol (hydrated), the product is propionic acid 4,4' - [2 - (4 - ethylcyclohexyl)propenylidene]diphenol di ester; M.P. 107–108° C.

Example 10

A solution of 320 mg. of 4,4'-[2-(4-methylcyclohexyl)propenylidene]diphenol (principally isomer A), 300 mg. of cyclohexanecarbonyl chloride, and 3.0 ml. of pyridine is allowed to stand at room temperature for 18 hours and is then concentrated to dryness to give a residue of cyclohexanecarboxylic acid, 4,4'-[2-(4-methylcyclohexyl)propenylidene]diphenol diester. For purification, the product is dissolved in ether and fractionated on a chromatography column prepared with 10 g. of alumina, using additional portions of ether for elution. The recovered product has M.P. 137–145° C. (principally isomer A).

Similarly, from 4,4'-[2-(4-ethylcyclohexyl)propenylidene]diphenol (hydrated), the product is cyclohexanecarboxylic acid, 4,4' - [2 - (4 - ethylcyclohexyl)propenylidene]diphenol diester; M.P. 169–173° C.

Example 11

A solution of 500 mg. of 4,4'-[2-(4-methylcyclohexyl)propenylidene]diphenol (principally isomer A) and 10 ml. of tetrahydrofuran is treated cautiously with 160 mg. of a 54% sodium hydride-mineral oil dispersion. Phenylacetyl chloride, 500 mg., is added and the mixture evaporated on a steam bath. Heating is continued an additional 1½ hours and the residue is then cooled and partitioned between 150 ml. of ether and 50 ml. of water. The ether phase is separated, washed with water, with dilute sodium bicarbonate solution, with dilute hydrochloric acid, again with water, dried, and concentrated to give a residue of phenylacetic acid, 4,4'-[2-(4-methylcyclohexyl)propenylidene]diphenol diester; infrared absorption maximum at 1759 reciprocal centimeters (principally isomer A).

Similarly, by substituting an equivalent amount of hydrocinnamoyl chloride, the product is hydrocinnamic acid, 4,4' - [2 - (4 - methylcyclohexyl)propenylidene]diphenol diester; infrared absorption maximum at 1759 reciprocal centimeters (principally isomer A).

Example 12

A solution of 322 mg. of 4,4'-[2-(4-methylcyclohexyl)propenylidene]diphenol (principally isomer A), 0.4 ml. of phenyl isocyanate, and 10 ml. of tetrahydrofuran is allowed to stand one hour and then concentrated to dryness on a steam bath. The residue is heated at 95° C. for one hour, cooled, and stirred with 20 ml. of ether. Insoluble diphenylurea is removed by filtration and the filtrate is diluted with pentane to induce crystallization. The product is collected on a filter. It is 4,4'-[2-(4-methylcyclohexyl)propenylidene]diphenol, dicarbanilate ester; M.P. 110–113° C. following crystallization from ether-pentane (principally isomer A).

Example 13

A solution of 200 mg. of 4,4'-[2-(4-ethylcyclohexyl)propenylidene]diphenol (hydrated), 600 ml. of ethyl chloroformate, and 4 ml. of pyridine is heated at 90° C. for one hour and concentrated in vacuo. For purification, the residue is dissolved in ether-petroleum ether and chromatographed on a column prepared with 10 g. of alumina. The product is carbonic acid, ethyl ester, ester with 4,4'-[2 - (4 - ethylcyclohexyl)propenylidene]diphenol; M.P. 73–78° C.

Example 14

A solution of 336 mg. of 4,4'-[2-(4-ethylcyclohexyl) propenylidene]diphenol (hydrated), 0.4 ml. of phenyl isocyanate, and 10 ml. of tetrahydrofuran is heated at reflux for one hour, concentrated in vacuo, and the residue heated at 90–100° C. for an additional hour. The residue is crystallized from ether-pentane. It is 4,4'-[2-(4-ethylcyclohexyl) propenylidene]diphenol, dicarbanilate ester; M.P. 103–106° C.

Example 15

A solution of 200 mg. of 4,4'-[2-(4-ethylcyclohexyl) propenylidene]diphenol (hydrated), 200 mg. of methanesulfonyl chloride, and 2 ml. of pyridine is allowed to stand at room temperature for 18 hours and then concentrated in vacuo. For purification, the residue is dissolved in ether and chromatographed on a column prepared with 10 g. of alumina. The product is methanesulfonic acid, 4,4' - [2 - (4 - ethylcyclohexyl)propenylidene]diphenol diester; M.P. 80–81° C.

In the same manner, by the substitution of 400 mg. of p-toluenesulfonyl chloride for the methanesulfonyl chloride, the product is p-toluenesulfonic acid, 4,4'-[2-(4-ethylcyclohexyl)propenylidene]diphenol diester; M.P. 122.5–124° C.

Examples 16–17 illustrate the preparation of diphenols of the invention by reaction of an arylmagnesium bromide with an alkyl cycloalkylalkanoate followed by hydrolysis and dehydration; and conversion of the unpurified diphenols to esters of the invention by esterification.

Example 16

By the general procedure of Example 1, from 55.4 g. of 4 - (2 - tetrahydropyranyloxy)phenyl bromide, 4.8 g. of magnesium, and 200 ml. of tetrahydrofuran reacted with 19.8 g. of ethyl 2-(4-methylcyclohexyl)propionate (70% isomer A and 30% isomer B) in 100 ml. of tetrahydrofuran, followed by hydrolysis with 10 ml. of watre, filtration and subsequent dehydration with 60 ml. of 4 N hydrochloric acid, the product obtained is 4,4'-[2-(4-methylcyclohexyl)propenylidene]diphenol. The product, as obtained by concentration of the ether solution, is dissolved in 100 ml. of pyridine and 50 ml. of acetic anhydride. This mixture is allowed to stand for 24 hours and then concentrated almost to dryness. The residue is dissolved in a small volume of ether and the solution chromatographed over a column prepared with 100 g. of alumina using petroleum ether and petroleum ether-ether for elution. The first fractions are combined and evaporated to give 4,4'-[2-(4-methylcyclohexyl)propenylidene] diphenol, diacetate ester; M.P. 110–112° C. (89% isomer A and 11% isomer B). Repeated recrystallization from ether gives a slightly different isomer composition; M.P. 115–117° C. (91% isomer A and 9% isomer B).

Using starting material which is principally isomer B, the product is obtained as a mixture of 36% isomer A and 64% isomer B; M.P. 90–97° C.

The following additional products are prepared similarly.

From ethyl 2-cyclohexylpropionate, the products obtained are 4,4' - (2 - cyclohexylpropenylidene)diphenol; and its diacetate ester, M.P. 135–138° C.

From methyl 2-cyclohexylbutyrate, the products obtained are 4,4' - (2 - cyclohexyl - 1 - butenylidene)diphenol; and its diacetate ester, B.P. 84–230° C. at 0.4 mm.

From ethyl 2 - (4 - n - propylcyclohexyl)propionate, the products obtained are 4,4' - [2 - (4 - propylcyclohexyl)propenylidene)diphenol; and its diacetate ester; M.P. 110–112° C. following crystallization from pentane.

From ethyl 2 - (4 - isopropylcyclohexyl)propionate, the products obtained are 4,4' - [2 - (4 - isopropylcyclohexyl)-propenylidene]diphenol; and its diacetate ester; M.P. 126–130° C.

Example 17

By the general procedure of Example 1, from 46 g. of 4 - (2 - tetrahydropyranyloxy)phenyl bromide, 4.8 g. of magnesium, and 200 ml. of tetrahydrofuran reacted with 17.1 g. of ethyl 2-cyclopentylpropionate, followed by hydrolysis with 10 ml. of water, filtration and subsequent dehydration with 60 ml. of 4 N hydrochloric acid, the product obtained is 4,4'-(2-cyclopentylpropenylidene) diphenol. The product, as obtained by concentration of the ether solution, is heated at 70–100° C. for 3 hours with 50 ml. of pyridine and 30 ml. of benzoyl chloride. The mixture is cooled and partitioned with 500 ml. of water and 500 ml. of ether. The ether phase is separated, washed with water, dried, and evaporated to give a residue of 4,4' - (2 - cyclopentylpropenylidene)diphenol, dibenzoate ester; M.P. 130–133° C. (hydrated) following crystallization from ether-petroleum ether.

The following additional products are prepared similarly.

From ethyl 2-cyclopentylvalerate, the products obtained are 4,4' - (2 - cyclopentyl - 1 - pentenylidene)diphenol; and its dibenzoate ester, M.P. 150–153° C. following crystallization from ether-petroleum ether.

From ethyl 2 - (2 - methylcyclopentyl)propionate, the products obtained are 4,4' - [2 - (2 - methylcyclopentyl) propenylidene]diphenol; and its dibenzoate ester, M.P. 160–163° C. following chromatography over alumina and crystallization from ether-petroleum ether.

From ethyl 2 - cyclohexyl - 3 - methylbutyrate, the products obtained are 4,4' - (2 - cyclohexyl - 3 - methyl-1-butenylidene)diphenol; and its dibenzoate ester, M.P. 160–163° C. following chromatography over alumina and crystallization from ether-pentene. It is advantageous to carry out a partial purification of the diphenol before benzoylation by dissolving the diphenol in ether and adding petroleum ether in portions. The black tars which separate first are discarded and the brown oils which separate later are the partially purified diphenols.

From ethyl 2-(2-methylcyclohexyl)propionate, the products obtained are 4,4'-[2-(2-methylcyclohexyl)propenylidene]diphenol; and its dibenzoate ester, M.P. 174–177° C. following crystallization from ether-pentane.

From ethyl 2-(3-methylcyclohexyl)propionate, the products obtained are 4,4'-[2-(3-methylcyclohexyl)propenylidene]diphenol; and its dibenzoate ester, M.P. 158–161° C. following chromatography on alumina and crystallization from ether-petroleum ether.

From ethyl 2-(2-methylcyclohexyl)butyrate, the products obtained are 4,4'-[2-(2-methylcyclohexyl)-1-butenylidene]diphenol; and its dibenzoate ester, M.P. 175–178° C. following chromatography on alumina.

From ethyl 2-(4-methylcyclohexyl)butyrate, the products obtained are 4,4'-[2-(4-methylcyclohexyl)-1-butenylidene]diphenol; and its dibenzoate ester, M.P. 168–173° C. following chromatography on alumina and crystallization from ether-petroleum ether.

From ethyl 2-(4-methylcyclohexyl)valerate, the products obtained are 4,4'-[2-(4-methylcyclohexyl)-1-pentenylidene]diphenol; and its dibenzoate ester, M.P. 145–147° C. following chromatography on alumina and crystallization from ether-petroleum ether.

From ethyl 2-(2-ethylcyclohexyl)propionate, the products obtained are 4,4'-[2-(2-ethylcyclohexyl)propenylidene]diphenol; and its dibenzoate ester, M.P. 145–147° C. following chromatography on alumina and crystallization from ether.

From ethyl 2-(4-ethylcyclohexyl)propionate, the products obtained are 4,4'-[2-(4-ethylcyclohexyl)propenylidene]diphenol; and its dibenzoate ester, M.P. 179–183° C. by crystallization from ether.

From ethyl 2-(4-ethylcyclohexyl)butyrate, the products obtained are 4,4'-[2-(4-ethylcyclohexyl)-1-butenylidene]diphenol; and its dibenzoate ester, M.P. 162-164° C.

From ethyl 2-(2,4-dimethylcyclohexyl)propionate, the products obtained are 4,4'-[2-(2,4-dimethylcyclohexyl)-propenylidene]diphenol; and its dibenzoate ester, pale yellow oil following chromatography on alumina.

From ethyl 2-(3,4-dimethylcyclohexyl)propionate, the products obtained are 4,4'-[2,(3,4-dimethylcyclohexyl)-propenylidene]diphenol; and its dibenzoate ester, M.P. 165-175° C. following chromatography on alumina.

From ethyl 2-(4,4-dimethylcyclohexyl)propionate, the products obtained are 4,4'-[2-(4,4-dimethylcyclohexyl)-propenylidene]diphenol; and its dibenzoate ester, M.P. 159-161° C. following chromatography on alumina and crystallization from ether-pentane.

From ethyl 2-cycloheptylpropionate, the products obtained are 4,4'-(-cycloheptylpropenylidene)diphenol; and its dibenzoate ester, M.P. 163-167° C. following chromatography on alumina and crystallization from ether.

Example 18

A mixture of 2.7 g. of 4,4'-(2-cyclohexylpropenylidene)diphenol, diacetate ester, 100 ml. of methanol, and 16 ml. of 1 N sodium hydroxide is heated to boiling until solution occurs. It is then allowed to stand at room temperature for 2 hours, stirred with activated charcoal, and filtered. The filtrate is diluted with 200 ml. of water, acidified with acetic acid, and diluted with additional portions of water to precipitate the product, which is then collected on a filter. It is 4,4'-(2-cyclohexylpropenylidene)diphenol; M.P. 185-187° C. following crystallization from pentane-ether.

The following additional products are obtained by hydrolysis of the corresponding diacetate esters in the same manner. Other esters such as the dibenzoate esters can also be used as starting materials with equivalent results.

4,4'-(2-cyclohexyl-1-butenylidene)diphenol; M.P. 86-105° C. following crystallization from cyclohexane-acetone.

4,4' - [2-(4-methylcyclohexyl)propenylidene]diphenol; M.P. 190-193° C. (principally isomer B).

4,4' - [2-(4-propylcyclohexyl)propenylidene]diphenol; obtained as an oil.

4,4'-[2-(4-ethylcyclohexyl)propenylidene]diphenol (hydrated); M.P. 165-166° C.

Example 19

A solution of 1.6 g. of 4,4'-[2-(4-methylcyclohexyl)propenylidene]diphenol, diacetate ester (principally isomer A), 8 ml. of 1 N sodium hydroxide, and 100 ml. of methanol is allowed to stand for one hour and then concentrated almost to dryness at 50° C. under reduced pressure. The residue is dissolved in 150 ml. of water and acidified with dilute hydrochloric acid. The insoluble product is collected on a filter, washed with water, and dissolved in ether. The ether solution is dried, filtered, and evaporated to give a residue of 4,4'-[2-(4-methylcyclohexyl)propenylidene]diphenol; M.P. 72-85° C. following crystallization from ether-pentane (principally isomer A).

Example 20

A solution of 220 mg. of 4,4'-[2-(4-methylcyclohexyl)propenylidene]diphenol (principally isomer A) and 3 ml. of dihydropyran at 0° C. is treated with one drop of concentrated hydrochloric acid. The solution is allowed to stand at room temperature for 2 days and is then treated with 200 ml. of ether and excess 10% sodium hydroxide solution. The ether phase is separated, washed with water, dried, and evaporated to give a residue of 2,2'-{[2-(4-methylcyclohexyl)propenylidene]bis(p - phenyleneoxy)}bis[tetrahydropyran]; M.P. 116-118° C. following crystallization from methanol (principally isomer A).

Example 21

A mixture of 2.1 g. of 4,4'-(2-cyclohexylpropenylidene)diphenol, 4.6 g. of anhydrous potassium carbonate, 4.2 g. of dimethyl sulfate, and 100 ml. of anhydrous acetone is stirred at reflux for 18 hours. The insoluble inorganic salts are removed by filtration and the filtrate is concentrated almost to dryness in vacuo. The residue is dissolved in ether and the ether solution is washed with 5% sodium hydroxide solution and with water, dried over magnesium sulfate, filtered, and evaporated to give a residue of 4,4'-(2-cyclohexylpropenylidene)diphenol dimethyl ether; M.P. 83-85° C. The same product is obtained by reacting the diphenol with sodium hydride and methyl iodide.

STARTING MATERIALS

With stirring, a portion of a mixture of 110 g. of ethyl 2-bromopropionate and 59 g. of cyclohexanone is added to 39 g. of activated zinc powder and 600 ml. of dry benzene. When the reaction starts, the remainder is added at a rate sufficient to maintain reflux. The mixture is then heated at reflux two more hours and filtered. The filtrate is stirred with 200 ml. of cold 20% sulfuric acid and the benzene phase is separated, washed with water, and concentrated in vacuo. A solution of the residual oil in 150 ml. of toluene, containing 6.0 g. of p-toluenesulfonic acid monohydrate, is heated at reflux for 24 hours with continuous removal of the water formed in the reaction. The toluene solution is cooled, diluted with 300 ml. of ether, washed with water, dried, and distilled in vacuo. The product (103 g.) collected at B.P. 75-80° C. at 1.2 mm. is shaken with 1.0 g. of palladium on charcoal catalyst and 500 ml. of ethanol in a hydrogen atmosphere at 50 pounds per square inch pressure until the theoretical amount of hydrogen has been absorbed. The catalyst is removed by filtration and the filtrate is concentrated and then distilled in vacuo. Ethyl 2-cyclohexylpropionate is collected as a distillate having B.P. 72-75° C. at 3.0-3.5 mm. The following additional compounds are prepared similarly using the appropriate alkyl bromoalkanoate, and cycloalkanone as starting materials. Ethyl 2-(4-methylcyclohexyl)propionate (70% isomer A and 30% isomer B); B.P. 79-83° C. at 2.8 mm. Ethyl 2-(4-ethylclcohexyl)propionate; used without purification by distillation. Ethyl 2-(2-methylcyclohexyl)butyrate, prepared in a hydrogenation mixture also containing acetic acid; B.P. 71-77° C. at 1.0 mm. Ethyl 2-(4-methylcyclohexyl)valerate; used without purification by distillation. Ethyl 2-(4-ethylcyclohexyl)propionate; used without purification by distillation. Ethyl 2-(4-ethylcyclohexyl)butyrate; B.P. 86-94° C. at 0.5-0.6 mm. Ethyl 2-(4-n-propylcyclohexyl)propionate; B.P. 80-95° C. at 0.3 mm. Ethyl 2-(4-isopropylcyclohexyl)propionate; B.P. 89-98° C. at 0.4 mm. Ethyl 2-cycloheptylpropionate; B.P. 60-80° C. at 0.5 mm.

The following additional compounds are similarly prepared from alkyl bromoalkanoate and a cycloalkanone, except that the hydrogenation is carried out in the presence of a platinum catalyst. For example, ethyl 2-bromopropionate and 4-methylcyclohexanone are reacted with zinc in benzene and the product is isolated following reaction with cold 20% sulfuric acid and then with p-toluenesulfonic acid monohydrate in refluxing toluene, as described above. A mixture of 245 g. of this product, 4 g. of platinum on carbon catalyst, 1200 ml. of ethanol, and 20 ml. of glacial acetic acid is shaken in a hydrogen atmosphere at 50 pounds per square inch pressure until the theoretical amount of hydrogen has been absorbed. The catalyst is removed by filtration and the filtrate is concentrated and then distilled in vacuo. Ethyl 2-(4-methylcyclohexyl)propionate (34% isomer A and 66% isomer B) is collected as a distillate having B.P. 97-103° C. at 6.0 mm. The following additional compounds are prepared similarly. Ethyl 2-cyclopentylpropionate, used without purification by distillation. Ethyl 2-(2-methylcyclopentyl)propionate; B.P. 97–100° C. at 3.0 mm. Ethyl 2-cyclohexyl-3-methylbutyrate; B.P. 66–73° C. at 0.5 mm. Ethyl 2-(2-methylcyclohexyl)propionate, B.P. 70–81° C. at 2.5 mm. Ethyl 2-(2-ethylcyclohexyl)propionate; B.P. 120–128° C. at 25–30 mm. Ethyl 2-(2,4-dimethylcyclohexyl)propionate); B.P. 55–78° C. at 0.3 mm. Ethyl 2-(3,4-dimethylcyclohexyl)propionate; B.P. 75–88° C. at 0.8 mm. Ethyl 2 - (4,4-dimethylcyclohexyl)propionate; B.P. 60–74° C. at 0.3–0.4 mm. In the following cases, the hydrogenation is begun using palladium on carbon catalyst in ethanol and completed using platinum on carbon catalyst in ethanol containing a minor proportion of glacial acetic acid. Ethyl 2-(3-methylcyclohexyl)propionate; B.P. 60–71° C. at 0.7–1.0 mm. Ethyl 2-(4-methylcyclohexyl)butyrate; B.P. 73–77° C. at 1.2 mm.

A solution of 31.0 g. of 2-cyclopentylvaleric acid, 300 ml. of ethanol, and 7 g. of hydrogen chloride is allowed to stand for 4 hours, heated at reflux for 2 hours, and then concentrated almost to dryness. The residue is distilled in vacuo. Ethyl 2-cyclopentylvalerate is collected as a distillate having B.P. 70–74.5° C. at 0.8–1.1 mm. In the same manner, the product obtained from 2-cyclohexylbutyric acid and methanol in the presence of hydrogen chloride is methyl 2-cyclohexylbutyrate; B.P. 50° C. at 0.25 mm.

I claim:
1. A compound of the formula

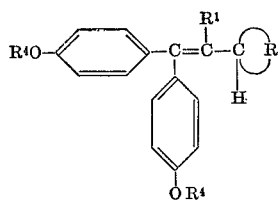

where:
R is a member of the class consisting of (a) alkylene radicals containing 4 to 8 carbon atoms inclusive of which 4 or 5 are in annular position with the carbon atom to which R is attached and (b) hexamethylene;
$R^1$ is a member of the class consisting of hydrogen and lower alkyl;
$R^4$ is a member of the class consisting of hydrogen, tetrahydropyranyl, and lower alkanoyl.

2. A compound according to claim 1 which is 4,4'-[2-cyclohexyl)propenylidene]diphenol, diacetate ester.

3. A compound according to claim 1 which is 4,4'-[2-(4 - methylcyclohexyl)propenylidene]diphenol, diacetic ester.

4. A compound according to claim 1 which is 4,4'-[2-(4 - propylcyclohexyl)propenylidene]diphenol, diacetic ester.

References Cited
UNITED STATES PATENTS 3,237,200   2/1966   Barany et al. ......... 260—479
3,031,449   4/1962   Allen et al. .......... 260—479
3,287,397   11/1966  Olsson et al. ........ 260—619 A

OTHER REFERENCES

Advanced Org. Chem. Reactions, Mechanisms & Structure Jerry, March, pp. 305, 310, 344, 688, 753, 1968.
Chemistry of Org. Cpds., Carl R. Noller, p. 681, 1965.

JAMES A. PATTEN, Primary Examiner

J. L. DAVISON, Assistant Examiner

U.S. Cl. X.R.

260—240 R, 345.9 456 P, 463, 468 R, 471 C, 476 R, 613 R, 619 A; 424—283, 303, 308, 309, 311, 343